Patented July 29, 1924.

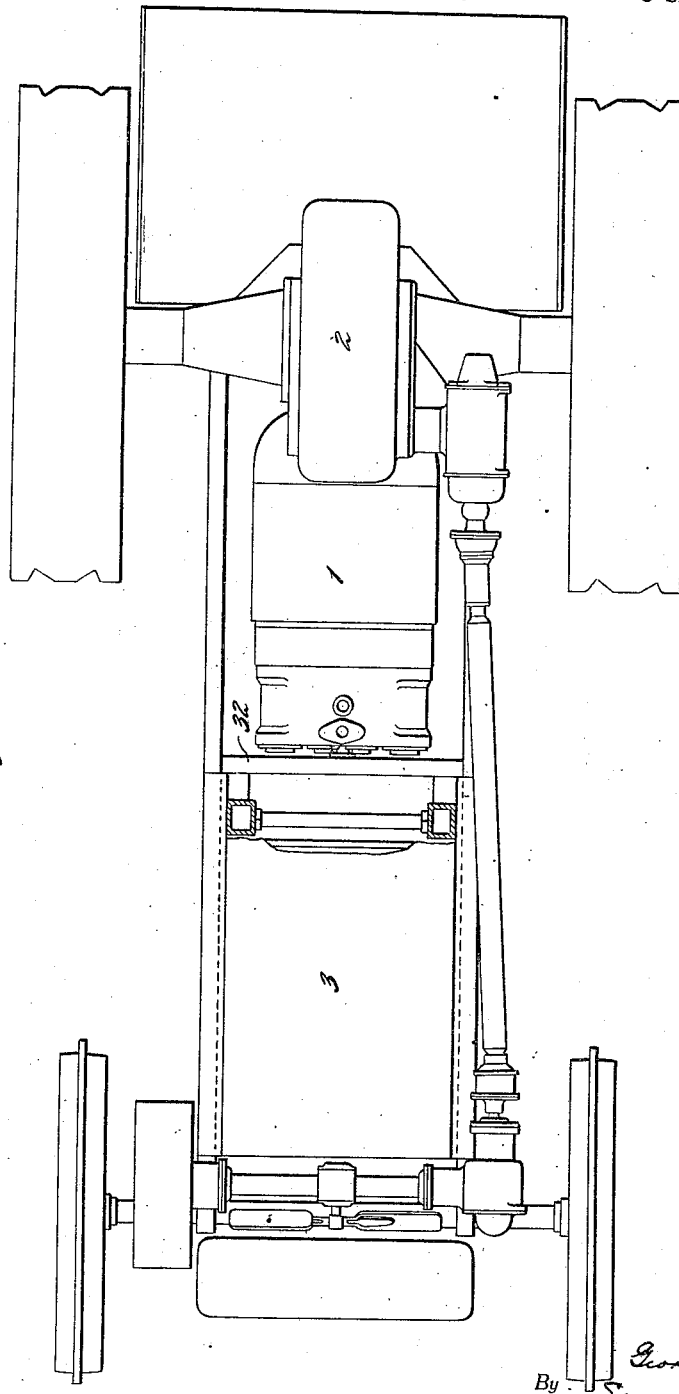

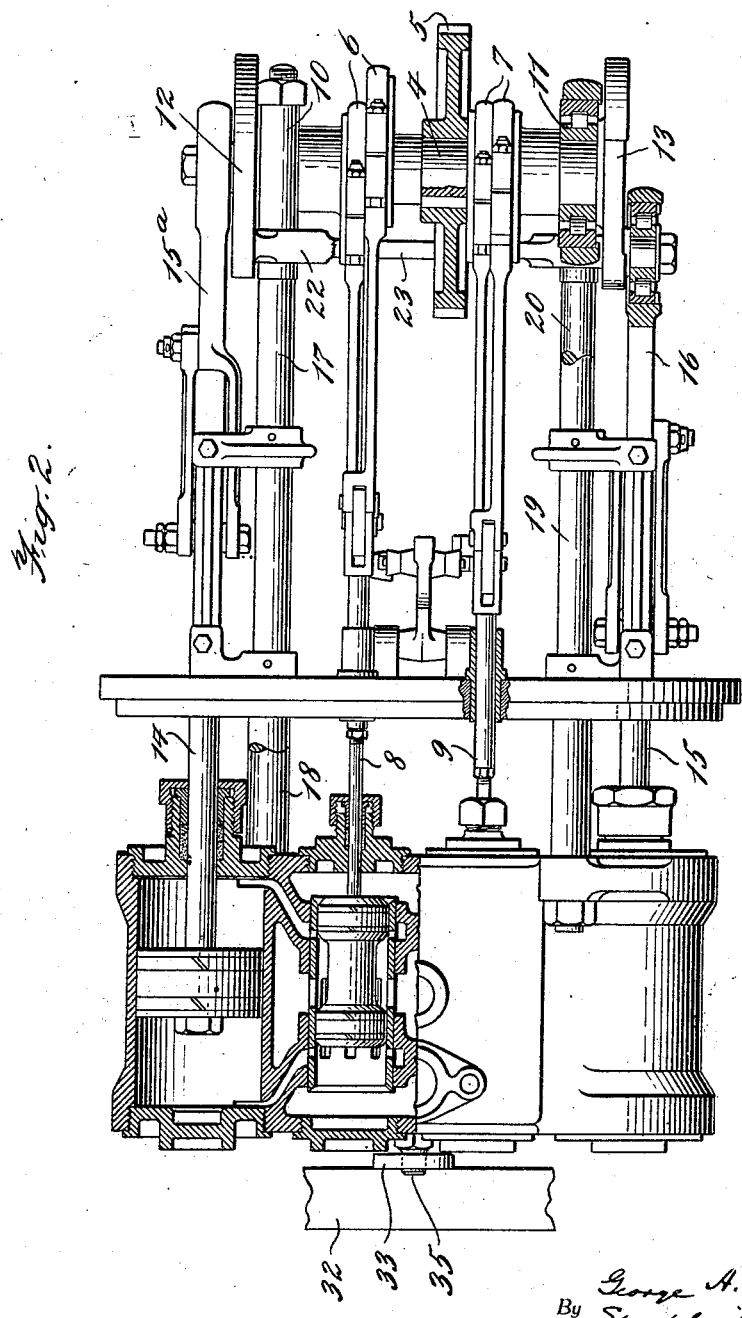

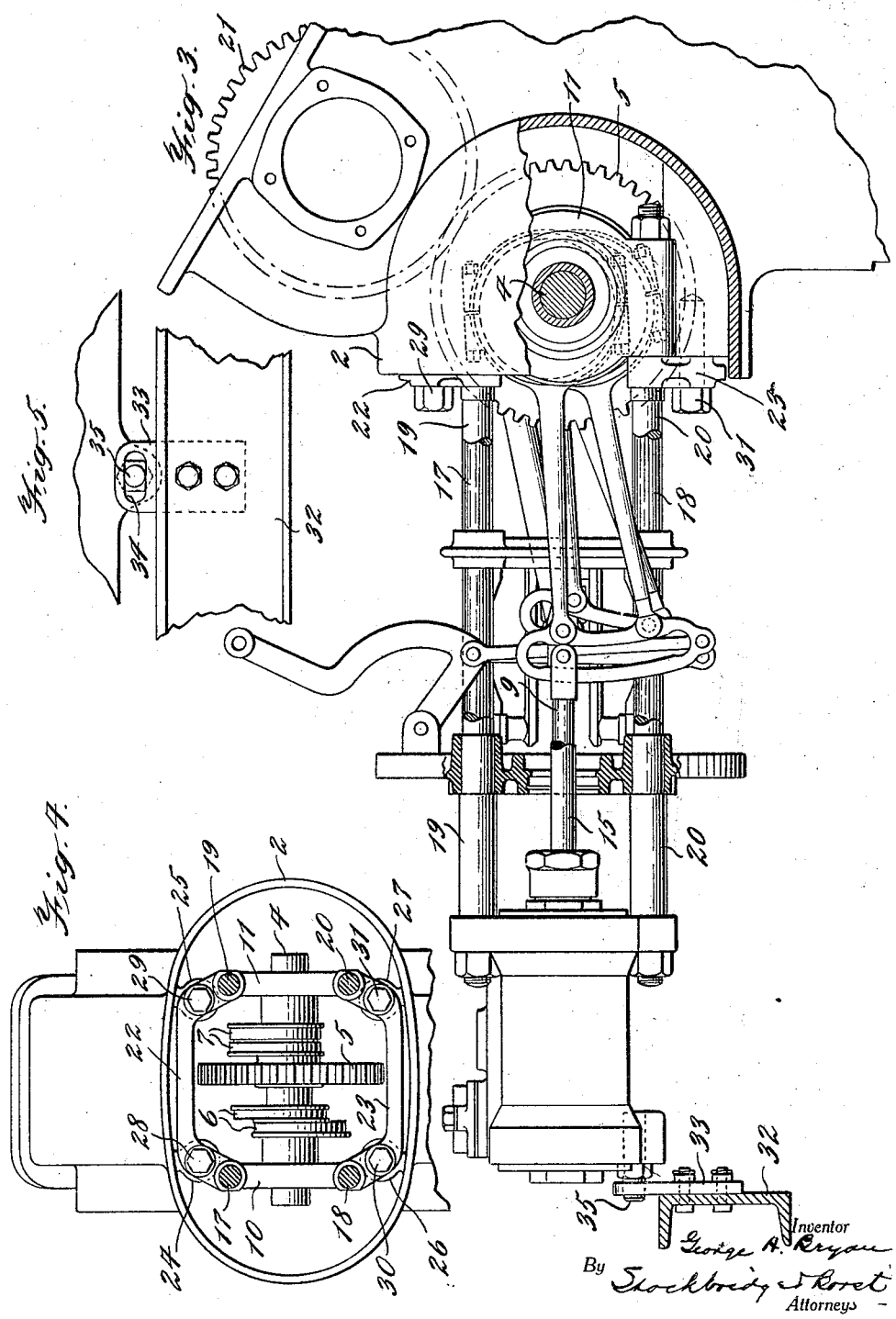

1,502,978

UNITED STATES PATENT OFFICE.

GEORGE ALFRED BRYAN, OF PERU, INDIANA, ASSIGNOR TO BRYAN HARVESTER COMPANY, INC., A CORPORATION OF NEW MEXICO.

ENGINE MOUNTING FOR STEAM-PROPELLED VEHICLES.

Application filed February 9, 1922. Serial No. 535,167.

*To all whom it may concern:*

Be it known that I, GEORGE A. BRYAN, a citizen of the United States, residing at Peru, in the county of Miami and State of Indiana, have invented certain new and useful Improvements in Engine Mountings for Steam-Propelled Vehicles, of which the following is a full, clear, and exact description.

My invention relates to steam propelled vehicles, such as tractors, trucks and the like, and particularly to the support for the engine in such vehicles.

A general object of my invention is to provide a construction in which the engine may be removed or replaced as a unit without disturbing any of the other parts of the vehicle. Another object is to provide a support for the engine which will be entirely secure and will properly distribute the weight of the engine, and which, at the same time will afford the desired flexibility relative to the parts on which it is mounted. Other objects are simplicity and reliability of construction. Still other objects and advantages of my invention will appear from the following description.

Vehicles of this character commonly have the steam generator or boiler mounted on the front end of the chassis frame, the transmission and differential case on the rear axle, and the steam engine between the boiler and transmission case. In accordance with my invention I arrange the engine horizontally with a spur gear on the crank shaft meshing directly with the first gear in the transmission train, and so mounted that only a comparatively slight forward movement of the engine as a whole is required to get the engine clear of the other parts so that it may be removed. A sufficient clearance between the front end of the engine and the rear face of the boiler is provided to allow of this movement.

More specifically two hangers or yokes are attached to the front of the transmission case and engage the tie rods which couple the crank shaft bearings and the cylinder casting, immediately in front of the bearings, whereby the rear end of the engine is supported with the crank shaft just inside the transmission case, and is released by merely detaching the hangers from the transmission case.

My invention also contemplates a support, such as a tongue and groove construction, for the front end of the engine which will admit of a certain amount of lateral play. Specifically I have a stud on the front end of the engine which engages in a lateral slot on a plate attached to a cross frame member, although manifestly a reversal of the plate and stud would be an equivalent construction.

My invention also comprehends other features of construction, and details and arrangements of parts as will hereinafter more fully appear. I shall now describe the illustrated embodiment of my invention and shall thereafter point out my invention in claims.

Fig. 1 is a more or less conventional representation in plan of a steam tractor embodying my invention.

Fig. 2 is an enlarged plan, partially in section of the engine and associated parts.

Fig. 3 is a side elevation of the same, partially in section, with a fragment of the transmission case.

Fig. 4 is a front end elevation of the transmission case on a reduced scale, showing the crank shaft and parts carried thereby supported in place in the case.

Fig. 5 is a detail illustrating the support for the front end of the engine.

The location of the engine on the tractor with respect to the boiler and transmission case is clearly shown in Fig. 1, the engine being designated generally by the numeral 1, the transmission case by the numeral 2 and the boiler by the numeral 3. The boiler is jacketed, the rear portion of the jacket being broken away to disclose a portion of the water circulating system. While the invention is independent of the type of boiler used, I have shown for the purpose of illustration, a boiler of the construction disclosed in my co-epnding application Serial No. 490,354, filed August 6th, 1921. The engine is a double-acting, simple, two cylinder engine, equipped with the Stephenson link motion for the slide valves, and the crank shaft and parts carried thereby are tied to the cylinders into a unitary structure, as will hereinafter appear. In Fig. 1 the link motion, connecting rods, etc., are shown enclosed in a suitable jacket.

The boiler is supported in any convenient way at the front end of the chassis, and the transmission case which contains the transmission gears connected to the differential is disposed on the rear axle. The engine is located between the boiler and the transmission case.

The crank shaft 4 has a spur gear 5 keyed to its center, and has on either side of the gear wheel 5 the usual eccentrics 6 and 7 for operating the valve rods 8 and 9 through the link motion, as shown. Outside of the eccentrics are suitable ball bearings 10 and 11 for the crank shaft, while on the extreme outer ends of the crank shaft are the regular cranks 12 and 13 which are connected to the piston rods 14 and 15, through the connecting rods 15ª and 16.

The two bearings 10 and 11 are provided at their top and bottom with longitudinal, cylindrical, hollow bosses formed integral with the bearings. The top boss of bearing 10 is shown in Fig. 2 and the bottom boss of bearing 11 is shown in Fig. 3. Four tie rods pass through these cylindrical bosses on the bearings and at their other end pass through holes provided for them in correspondingly arranged bosses on the cylinder casting. The two tie rods on the left side are numbered 17 and 18 and those on the right side are numbered 19 and 20. These rods are reduced slightly in diameter for the portion of their length which extends through the openings in the respective bosses, and are screw threaded on their ends and receive nuts, which serve to tie the whole structure rigidly together. The shoulders formed by the reduction in diameters of the rods form abutments which cooperate with the nuts at the ends of the tie rods to hold the cylinders and the crank shaft properly spaced.

The crank shaft of the engine is supported just inside the transmission case 2, the front end of which is open for the purpose, as shown particularly in Fig. 4. In this position the gear wheel 5 meshes with the first gear 21 of the transmission train.

The crank shaft is removably attached in this position to the front end of the transmission case through two hangers or yoke members 22 and 23, one at the top and one at the bottom of the opening in the transmission case. These yokes approximate a U-shape, the upper yoke 22 being inverted with respect to the lower yoke 23. Two bosses 24 and 25 are cast integral with the transmission case on the top wall near the opening at its front end, and two lower bosses 26 and 27 are similarly formed on the bottom wall, substantially at the mouth of the opening. Screw studs 28 and 29 serve to detachably secure the top yoke 22 to the bosses 24 and 25, and similar studs 30 and 31 secure the bottom yoke 23 to the bosses 26 and 27. The ends of the yokes 22 and 23 which extend beyond the studs are provided with holes of the proper size to receive the tie rods 17, 18, 19 and 20. These yokes engage the tie rods immediately in advance of the cylindrical bosses on the bearings, and it is therefore apparent that the crank shaft and the parts carried thereby may be secured in place in the transmission case or may be released therefrom, merely by inserting or removing the studs 28, 29, 30 and 31.

The support for the front end of the engine is shown as a single point support. The chassis frame is provided with a cross member 32 on the rear face of which is secured an upstanding plate 33, having a lateral slot 34 near its upper end (see Fig. 5). A stud 35 is secured in a central depending boss on the front end of the lower face of the cylinder casting, and this stud has a reduced front end which engages in the slot 34 in the plate 33. This slot and stud connection will permit of a certain twisting or warping of the frame of the tractor without subjecting the engine support to any strain.

It is manifest that to remove the engine from the tractor, for repair or other purposes, it is only necessary to take out the studs 28, 29, 30 and 31, and release the stud 35 from the plate 33, (which may be done by taking off the plate 33), and slide the engine forward a slight distance sufficient to clear the crank shaft from the transmission case, when the engine may be lifted out bodily. Sufficient clearance is provided between the front end of the engine and the rear face of the boiler to permit the engine to be moved forward the slight distance necessary to clear the crank shaft from the transmission case. In this way the engine may be removed or inserted as a unit without the necessity of any considerable taking-down of the tractor.

It is obvious that various modifications may be made in the construction shown in the drawings and above particularly described within the principle and scope of my invention.

I claim:

1. In a self propelled vehicle, the combination of a transmission case on the rear axle open at its front end, a unitary engine mechanism including cylinders, crank shaft and connecting rods, two bearings for the crank shaft, tie rods coupling the cylinders and bearings for the crank shaft, a yoke member on the rods removably attached to the front end of the transmission case and supporting the tie rods with the crank shaft within the opening, and means for supporting the front end of the engine.

2. In a self propelled vehicle, the combination of a transmission case on the rear axle open at its front end, a unitary engine mechanism including cylinders, crank shaft and connecting rods, two bearings for the crank shaft, tie rods coupling the cylinders and bearings for the crank shaft, a yoke member on the tie rods removably attached to the front end of the transmission case and supporting the tie rods with the crank shaft within the opening, a cross frame member for supporting the front end of the engine, and a connection between said cross frame member and front end allowing lateral play of the engine relative to the cross member.

3. In a self propelled vehicle, the combination of a transmission case on the rear axle open at its front end, a unitary engine mechanism including cylinders, crank shaft and connecting rods, two bearings for the crank shaft, tie rods coupling the cylinders and bearings for the crank shaft, a yoke member on the tie rods removably attached to the front end of the transmission case and supporting the tie rods with the crank shaft within the opening, a cross frame member for supporting the front end of the engine, a supporting plate on the cross member having a lateral slot therein, and a stud on the front end of the engine engaging in said slot.

4. In a self propelled vehicle, the combination of a transmission case on the rear axle open at its front end, a unitary engine mechanism including cylinders, crank shaft and connecting rods, two bearings for the crank shaft, tie rods coupling the cylinders and bearings for the crank shaft, and a yoke member engaging and supporting the tie rods immediately in front of the bearings and removably attached to the front end of the transmission case.

5. In a self propelled vehicle, the combination of a transmission case on the rear axle open at its front end, a unitary engine mechanism including cylinders, crank shaft and connecting rods, two bearings for the crank shaft, four tie rods coupling the cylinders of the engine with the top and bottom, respectively, of the bearings, and two opposing yoke members each engaging and supporting two tie rods immediately in front of the bearings and removably attached to the front end of the transmission case.

6. In a self propelled vehicle, the combination of a transmission case on the rear axle open at its front end and having two integral bosses near the mouth of the opening, a unitary engine mechanism including cylinders, crank shaft and connecting rods, two bearings for the crank shaft, tie rods coupling the cylinders and bearings for the crank shaft, a yoke member engaging the tie rods and spanning the same, means removably attaching the yoke member to the said bosses and thereby supporting the crank shaft within the opening, a cross frame member for supporting the front end of the engine, and a connection between said cross frame member and front end allowing lateral play of the engine relative to the cross member.

In witness whereof, I hereunto subscribe my signature.

GEORGE ALFRED BRYAN.